(12) United States Patent
Razak et al.

(10) Patent No.: US 10,916,121 B2
(45) Date of Patent: Feb. 9, 2021

(54) VIRTUAL MAINTENANCE MANAGER

(71) Applicant: Johnson Controls Technology Company, Auburn Hills, MI (US)

(72) Inventors: Abdul Razak, Cork (IE); Gopi Subramanian, Boca Raton, FL (US); Conor Joseph Donovan, Cork (IE); Michael Stewart, Deerfield Beach, FL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/417,359

(22) Filed: May 20, 2019

(65) Prior Publication Data
US 2019/0355240 A1 Nov. 21, 2019

Related U.S. Application Data

(60) Provisional application No. 62/674,176, filed on May 21, 2018.

(51) Int. Cl.
*G06F 40/20* (2020.01)
*G06F 3/0481* (2013.01)
(Continued)

(52) U.S. Cl.
CPC ......... *G08B 29/185* (2013.01); *G06F 3/0481* (2013.01); *G06N 5/025* (2013.01);
(Continued)

(58) Field of Classification Search
CPC ........ G08B 29/185; G06N 5/025; G06N 5/04; G06N 5/046; G06F 3/0481; G06F 40/20;
(Continued)

(56) References Cited

U.S. PATENT DOCUMENTS 1,005,580 A * 10/1911 Sterling .................... A01L 7/04
  168/30
4,821,027 A *  4/1989 Mallory ................. G08B 19/00
  340/506

(Continued)

OTHER PUBLICATIONS

U.S. Appl. No. 16/368,611, filed Mar. 28, 2019, Johnson Controls Technology Company.
(Continued)

*Primary Examiner* — Yongjia Pan
(74) *Attorney, Agent, or Firm* — Foley & Lardner LLP

(57) ABSTRACT

A user interface for a security system includes a processing circuit, the processing circuit including a processor and memory coupled to the processor, the memory having instructions stored thereon that, when executed by the processor, cause the processing circuit to receive, from a user via a user device, a user request for information relating to the security system, determine, using natural language processing, an intent and one or more entities associated with the user request, the intent describing a purpose of the user request and the one or more entities describing a type or source of security system data, generate a response to the user request based on the intent and the one or more entities, wherein the response is a graphical display of security system data, and send the response to the user device.

21 Claims, 11 Drawing Sheets

(51) Int. Cl.
*G08B 29/18* (2006.01)
*G06N 5/02* (2006.01)
*G06N 5/04* (2006.01)
*G06Q 10/10* (2012.01)
*G06F 3/16* (2006.01)
*G06F 16/904* (2019.01)
*G05B 15/02* (2006.01)

(52) U.S. Cl.
CPC ............ G06N 5/04 (2013.01); G06Q 10/105 (2013.01); *G05B 15/02* (2013.01); *G06F 3/167* (2013.01); *G06F 40/20* (2020.01)

(58) Field of Classification Search
CPC ........ G06F 3/167; G06F 16/904; G06F 40/30; G06F 40/35; G06F 40/284; G06F 40/56; G06Q 10/105
See application file for complete search history.

(56) References Cited

U.S. PATENT DOCUMENTS

| | | | | |
|---|---|---|---|---|
| 5,786,756 | A * | 7/1998 | Piller | G08B 29/26 340/286.05 |
| 6,665,004 | B1 * | 12/2003 | Paff | G08B 13/19645 348/156 |
| 8,056,130 | B1 * | 11/2011 | Njemanze | H04L 63/1425 709/224 |
| 2003/0110398 | A1 * | 6/2003 | Dacier | G06F 11/0709 726/4 |
| 2004/0049698 | A1 * | 3/2004 | Ott | G06F 21/554 726/23 |
| 2004/0255167 | A1 * | 12/2004 | Knight | G06Q 10/10 726/24 |
| 2008/0165000 | A1 * | 7/2008 | Morin | G06F 21/552 340/541 |
| 2013/0103391 | A1 * | 4/2013 | Millmore | G06Q 10/06 704/9 |
| 2014/0266669 | A1 * | 9/2014 | Fadell | G06N 5/04 340/501 |
| 2015/0061859 | A1 * | 3/2015 | Matsuoka | G08B 29/185 340/501 |
| 2015/0324706 | A1 * | 11/2015 | Warren | G06N 20/00 700/275 |
| 2015/0331666 | A1 * | 11/2015 | Bucsa | G10L 15/30 704/275 |
| 2015/0348400 | A1 * | 12/2015 | Zribi | G08B 29/185 340/506 |
| 2018/0315299 | A1 * | 11/2018 | Subramanian | G06K 9/6278 |
| 2018/0315300 | A1 | 11/2018 | Subramanian et al. | |

OTHER PUBLICATIONS

U.S. Appl. No. 16/368,620, filed Mar. 28, 2019, Johnson Controls Technology Company.

* cited by examiner would you prefer to get the results to your email?
If you prefer then please provide me your email address.

Abdul 5:15 PM
@*Alarm Manager* No, I would like to see the results here now.

Alarm Manager APP 5:15 PM
Fantastic, preparing your results to send here. Please give me a minute.

Alarm Manager APP 5:15 PM
added this CSV snippet: excelalarmdata ▼

| | |
|---|---|
| 1 | afl_group_name,site,site_addr1,site_city_name,site_state_id,site_zip_code_rule,cs_no,alarm_no,dt,policedispatch,logalarm,weeks,nameofday,counter,cluster_no |
| 2 | afl_group_name_0,15,site_addr1_96,Carmichael,CA,39312,Site Not Closed on Schedule,csno79,698920111,05/03/2018 20:15,No PD,Log Event,Week-10,Monday,1,8 |
| 3 | afl_group_name_0,38,site_addr1_128,Wilkinsburg,PA,31004,Site Not Closed on Schedule,csno128,711338470,24/03/2018 18:15,No PD,Action Alarm,Week-12,Saturday,1,5 |
| 4 | afl_group_name_0,104,site_addr1_50,North Miami,FL,54877,Site Not Closed on Schedule,csno117,713514770,28/03/2018 20:15,No PD,Action Alarm,Week-13,Wednesday,1,2 |
| 5 | afl_group_name_0,118,site_addr1_120,Lake Worth,FL,88749,Site Not Closed on Schedule,csno96,708712920,23/03/2018 19:15,No PD,Log Event,Week-11,Monday,1,2 |
| 6 | |

Alarm Manager APP 5:15 PM
Please check the above results, would you like to know more about your alarm management?

Abdul 5:15 PM
@*Alarm Manager* yes, please give me the alarm details for all the sites.

Alarm Manager APP 5:15 PM
Sure, there are 449 number of alarms coming from 143 sites in last 6 weeks.
Would you prefer to get the results to your email?
If you prefer then please provide me your email address.

Abdul 5:15 PM
@*Alarm Manager* yes, please forward the results to me email example@gmail.com

Message #second_draft

If you prefer then please provide me your email address.

Abdul 5:16 PM
@*Alarm Manager* yes, please forward the results to me email example@gmail.com

Alarm Manager APP 5:16 PM
Great, preparing your results to send in email. Please give me a minute.
Results have been sent to example@gmail.com, would you like to know more about your alarm management?

Abdul 5:17 PM
@*Alarm Manager* could you please tell me about the number of alarms effected by rule 1 between months mar and apr?

Alarm Manager APP 5:17 PM
Definitely, please wait a minute, compiling the results for rules Door Delay for dates between March and April.
The number of alarms for this rule are 2.
Do you want to know anything more about your alarm management?

Abdul 5:17 PM
@*Alarm Manager* yes, please tell me the number of alarms caused by rules 3 and 5 between months mar and apr

Alarm Manager APP 5:17 PM
Definitely, please give me a minute getting the alarm details for Burglary Alarm & Cancel (With Pd) and Early Open for dates between March and April.
The number of alarms are as follow:
Burglary Alarm & Cancel (With Pd): 0;
Early Open: 18;

What else would you like to see about your alarm management?

Abdul 5:18 PM
@*Alarm Manager* yes, could you please tell me the status of the site 141?

Alarm Manager APP 5:18 PM
Definitely, please be patient, putting together the results for site 141.
Site 141 has 7 number of alarms in last 6 weeks, mainly caused by Site Not Closed On Schedule (7 alarms) and 18 number of times system testings have bee

| + | Message #second_draft | @ :) |

@*Alarm Manager* what about site 241?

Alarm Manager APP 5:18 PM
Sure, please be patient, preparing the results for site 241.

Site 241 has 0 number of alarms in last 6 weeks and 10 number of times system testings have been performed at this site. What else would you like to see about your alarm management?

Abdul 5:19 PM
@*Alarm Manager* yes, show me the number of alarms at site 141.

Alarm Manager APP 5:19 PM
Sure, please wait a second, calculating the statistics for site 141.

Attaching the results for 141.

Alarm Manager APP 5:19 PM
uploaded this image: alarm details for site 141 ▸

Alarm details for site 141 (total 7 # of alarms)

Number of alarms 9  10  11  12  13  14
Weeks (between March - April)

Alarm Manager APP 5:19 PM
Please check the above results, would you like to know more about your alarm management?

Abdul 5:20 PM

Message #second_draft

VIRTUAL MAINTENANCE MANAGER

CLAIM OF PRIORITY

This application claims priority to provisional U.S. Patent Application 62/674,176 filed on May 21, 2018, entitled: "Virtual Maintenance Manager," the entire contents of which are incorporated by reference herein.

BACKGROUND

The present disclosure relates generally to a building management system (BMS) and more particularly to analyzing and addressing alarm events within the BMS.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, music, lighting, etc.) configured to facilitate monitoring and controlling the building space.

Security, operation, and maintenance centers often handle high volumes of event and alarm data generated by elements connected to a BMS. Some elements can include computers, virtual memory systems, operating system, applications (e.g., applications in a composite application management platform), wireless sensors, controllers, and other site-monitoring devices and systems. Efficiently prioritizing the numerous events and alarms can be very challenging.

SUMMARY OF THE INVENTION

One implementation of the present disclosure is a user interface for a security system includes a processing circuit, the processing circuit including a processor and memory coupled to the processor, the memory having instructions stored thereon that, when executed by the processor, cause the processing circuit to receive, from a user via a user device, a user request for information relating to the security system, determine, using natural language processing, an intent and one or more entities associated with the user request, the intent describing a purpose of the user request and the one or more entities describing a type or source of security system data, generate a response to the user request based on the intent and the one or more entities, wherein the response is a graphical display of security system data, and send the response to the user device.

In some embodiments, the user request is a request for a recommendation to reduce a number of false alarms. In some embodiments, the user interface generates a recommendation based on one or more rules, wherein the one or more rules are associated with the one or more entities. In some embodiments, the recommendation is a work order request, wherein the work order request is a request for a technician to service a component of the security system. In some embodiments, the recommendation is a behavioral recommendation, wherein the behavioral recommendation describes employee training. In some embodiments, the recommendation is a configuration recommendation, wherein the configuration recommendation describes a configuration change for a component of the security system. In some embodiments, the one or more rules are generated based on analysis of security system data received from the security system, wherein the analysis includes categorizing the security system data to determine if the security system data represents a false alarm.

Another implementation of the present disclosure is a method of interacting with a security system including receiving, from a user via a user device, a user request for information relating to the security system, determining, using natural language processing, an intent and one or more entities associated with the user request, the intent describing a purpose of the user request and the one or more entities describing a type or source of security system data, generating, based on the intent and one or more entities, a response to the user request, wherein the response is a graphical display of security system data, and sending the response to the user device.

In some embodiments, the user request is a request for a recommendation to reduce a number of false alarms. In some embodiments, the method further includes generating a recommendation based on one or more rules, the one or more rules associated with the one or more entities. In some embodiments, the recommendation is a work order request, wherein the work order request is a request for a technician to service a component of the security system. In some embodiments, the recommendation is a behavioral recommendation, wherein the behavioral recommendation describes employee training. In some embodiments, the recommendation is a configuration recommendation, wherein the configuration recommendation describes a configuration change for a component of the security system. In some embodiments, the one or more rules are generated based on analysis of security system data received from the security system, wherein the analysis includes categorizing the security system data to determine if the security system data represents a false alarm.

Another implementation of the present disclosure is a security system for a building management system (BMS) including a number of sensors located throughout a secure area, the number of sensors configured to collect information relating to the secure area, a false alarm reduction system configured to receive the information from the number of sensors and determine if the information relates to a false alarm and a virtual maintenance manager to allow a user to interact with the security system. The virtual maintenance manager is configured to receive, from the user via a user device, a user request for information relating to the security system, determine, using natural language processing, an intent and one or more entities associated with the user request, the intent describing a purpose of the user request and the one or more entities describing a type or source of security system data, generate, a response to the user request based on the intent and the one or more entities, wherein the response is a graphical display of security system data, and send the response to the user device.

In some embodiments, the virtual maintenance manager receives a user request for information relating to the security system, wherein the user request is a request for a recommendation to reduce a number of false alarms. In some embodiments, the virtual maintenance manager generates a recommendation based on one or more rules, the one or more rules associated with the one or more entities. In some embodiments, the recommendation is a work order request, wherein the work order request is a request for a technician to service one or more sensors of the number of sensors. In some embodiments, the recommendation is a behavioral recommendation, wherein the behavioral recommendation describes employee training. In some embodiments, the recommendation is a configuration recommendation, wherein the configuration recommendation describes a configuration change for one or more sensors of the number of sensors.

BRIEF DESCRIPTION OF THE DRAWINGS

FIG. 7B is another view of the example user interaction of FIG. 6A, according to some embodiments.

FIG. 7C is another view of the example user interaction of FIG. 6A, according to some embodiments.

FIG. 7D is another view of the example user interaction of FIG. 6A, according to some embodiments.

FIG. 7E is another view of the example user interaction of FIG. 6A, according to some embodiments.

DETAILED DESCRIPTION

Overview

As described above, building management systems (BMS) often handle high volumes of event and alarm data generated by subsystems within the building. False alarms are a particularly prevalent problem in BMS technology, and can occur frequently in large systems (e.g., in large buildings, in multi-site monitoring). In order to determine that an alarm is false and not a genuine problem, it is often necessary to investigate the alarm and discover its root cause. This can place a significant burden on the resources of a BMS and/or site personnel. False alarms can also have significant cost implications, for example, where alarms initiate calls to emergency services, which can lead to fines or additional penalties.

The causes of some false alarms can be due to hardware or software misconfiguration or misuse, leading to combinations of system events that initiate an alarm. Other alarm events can be generated during system testing. These alarms are false because they do not represent an immediate problem in the monitored area. Some persistently recurring false alarms can be removed by taking further action to remove the root causes.

Site personnel and BMS administrators need targeted and real-time assistance in identifying the root causes or context of some false alarms. Users can benefit from recommendations about further actions to take to reduce the frequency of certain false alarms.

The present disclosure includes systems and methods that simplify how alarm events from one or more sites are processed to provide actionable insights for building personnel. In some embodiments, the number of false alarms can be reduced by helping the user identify and solve the underlying issue causing the alarms.

In some embodiments, a virtual maintenance manager can analyze raw alarm events, classify each event into a rule using machine learning, and/or associate pre-determined recommendations for each rule. Further, in some embodiments, recommendations can be provided to the user to solve alarm problems. In some embodiments, a work order can be automatically placed based on the alarm events and corresponding recommendations. Rules can also be flagged as system tests, which can reduce the number of false alarms.

Building HVAC Systems and Building Management Systems

Figure 1:
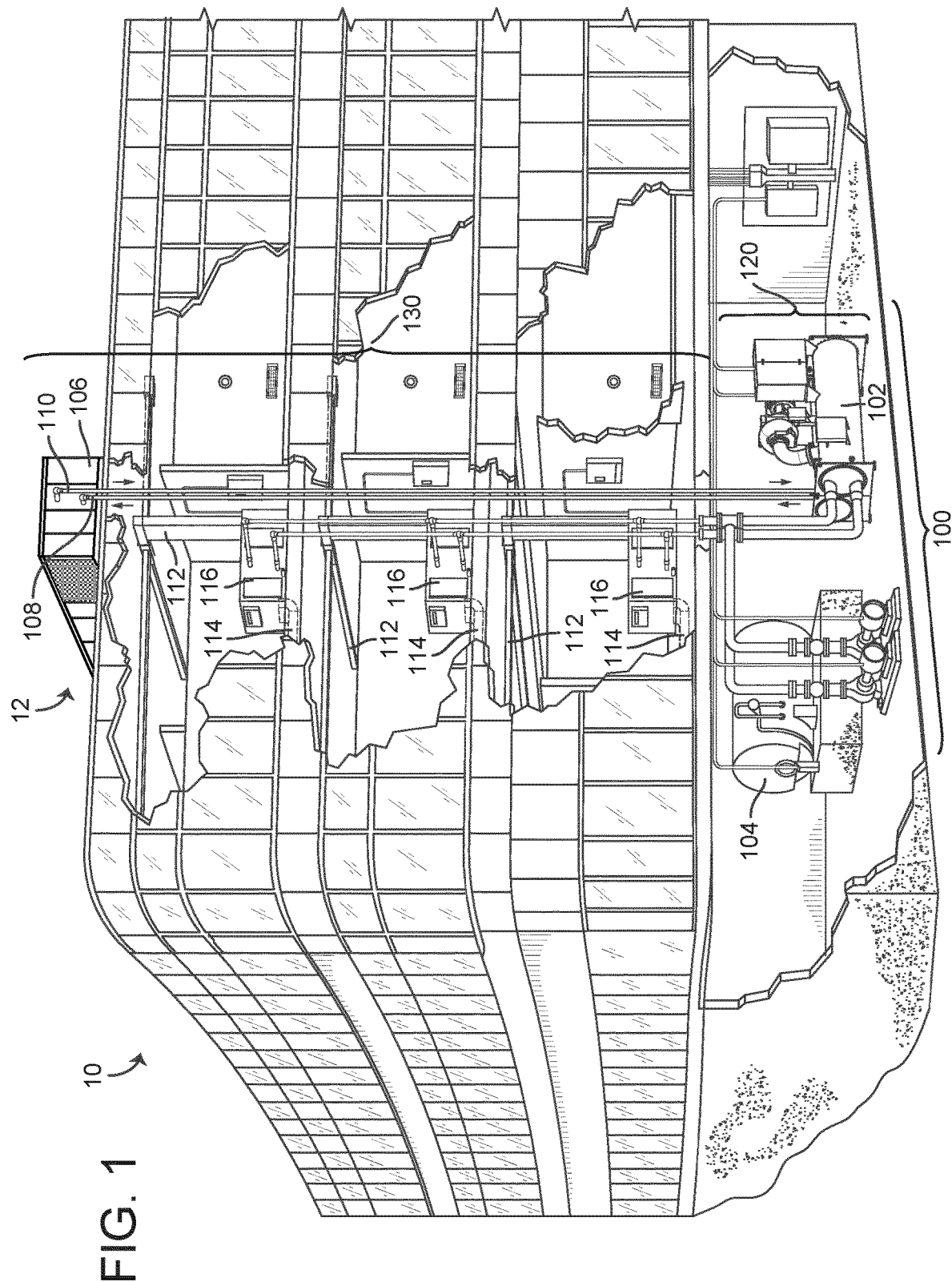
FIG. 1 is a drawing of a building equipped with a HVAC system, according to some embodiments.
Figure 2:
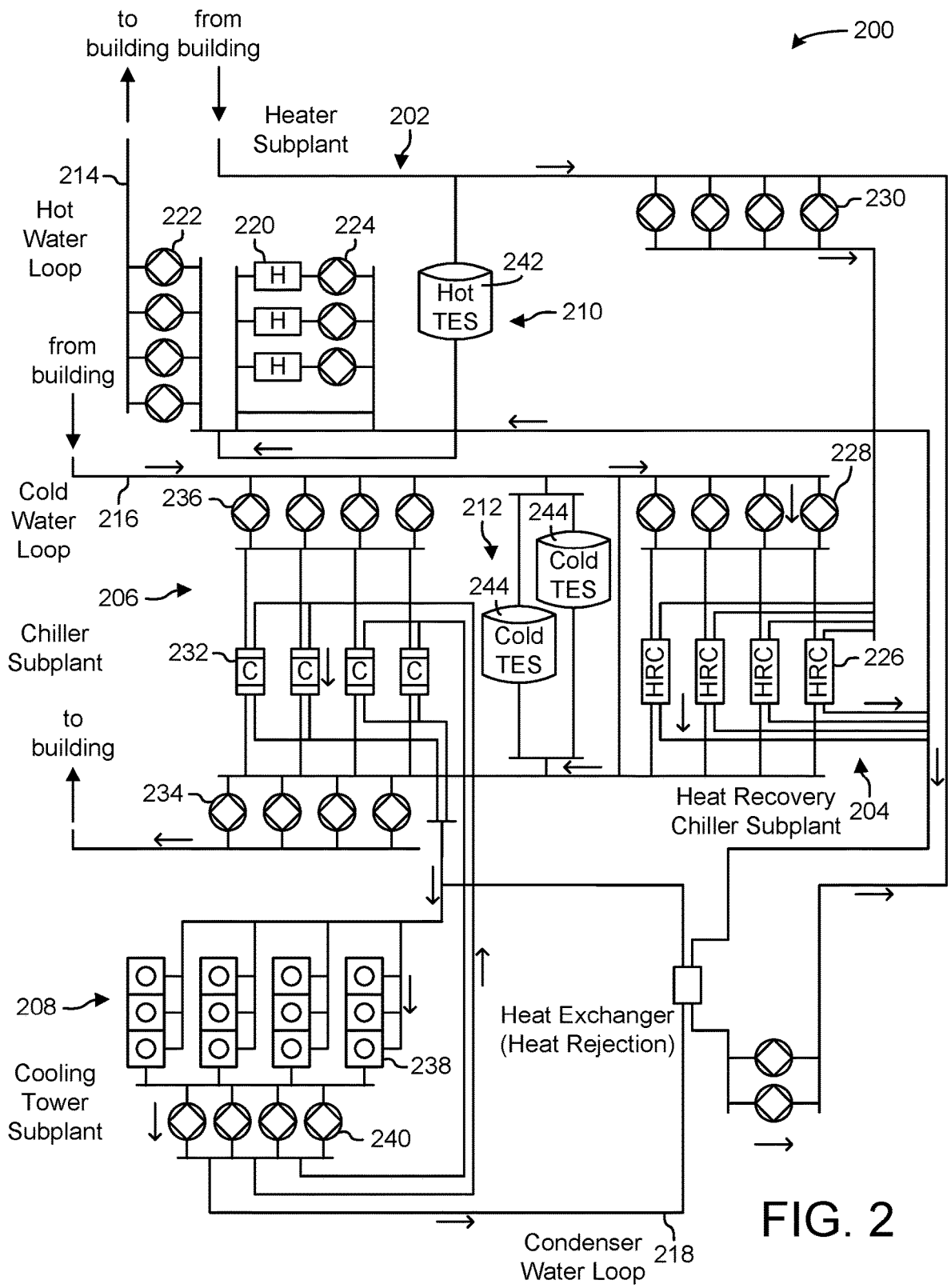
FIG. 2 is a block diagram of a waterside system which can be used to serve the building of FIG. 1, according to some embodiments.
Figure 3:
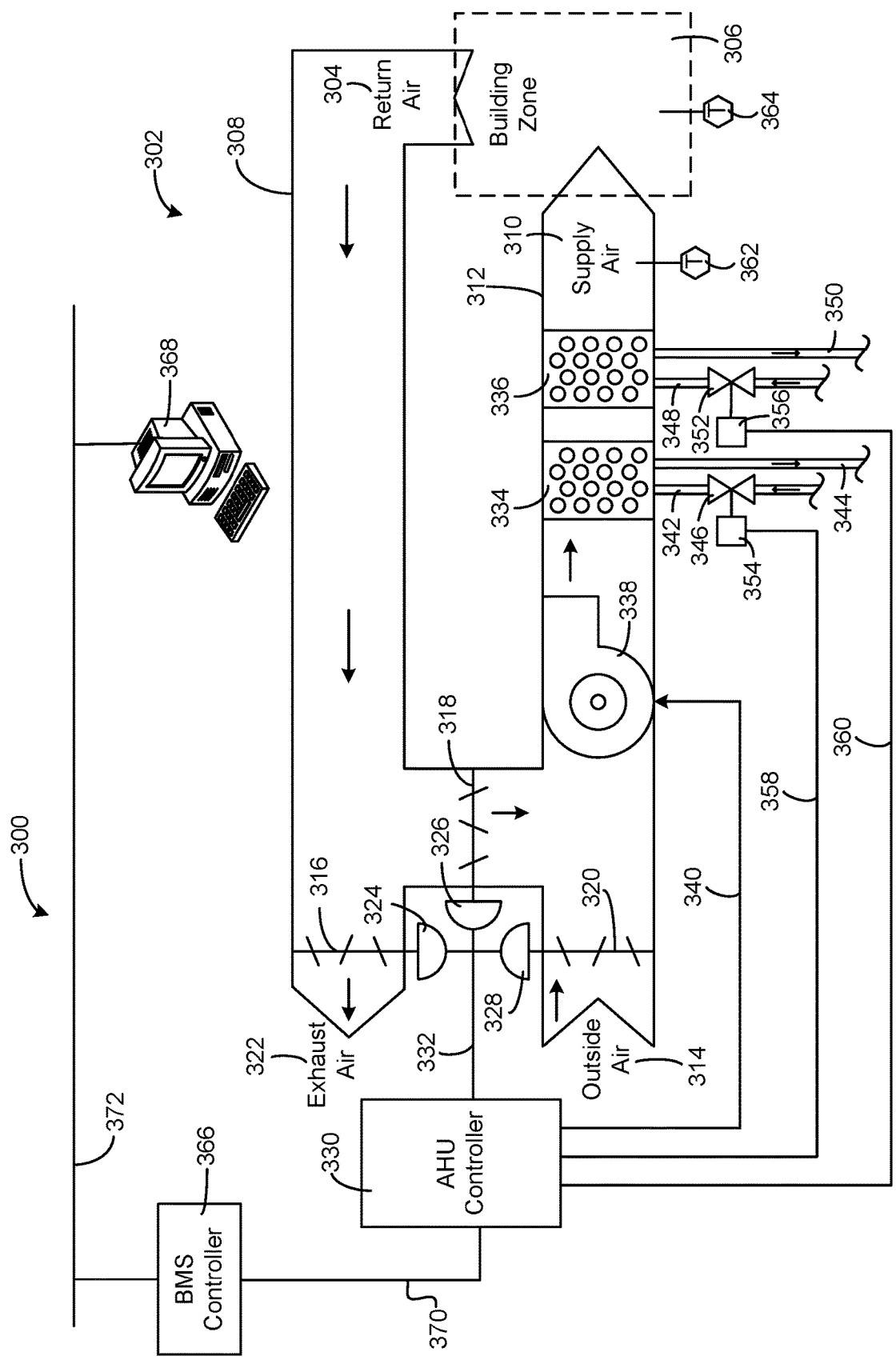
FIG. 3 is a block diagram of an airside system which can be used to serve the building of FIG. 1, according to some embodiments.
Figure 4:
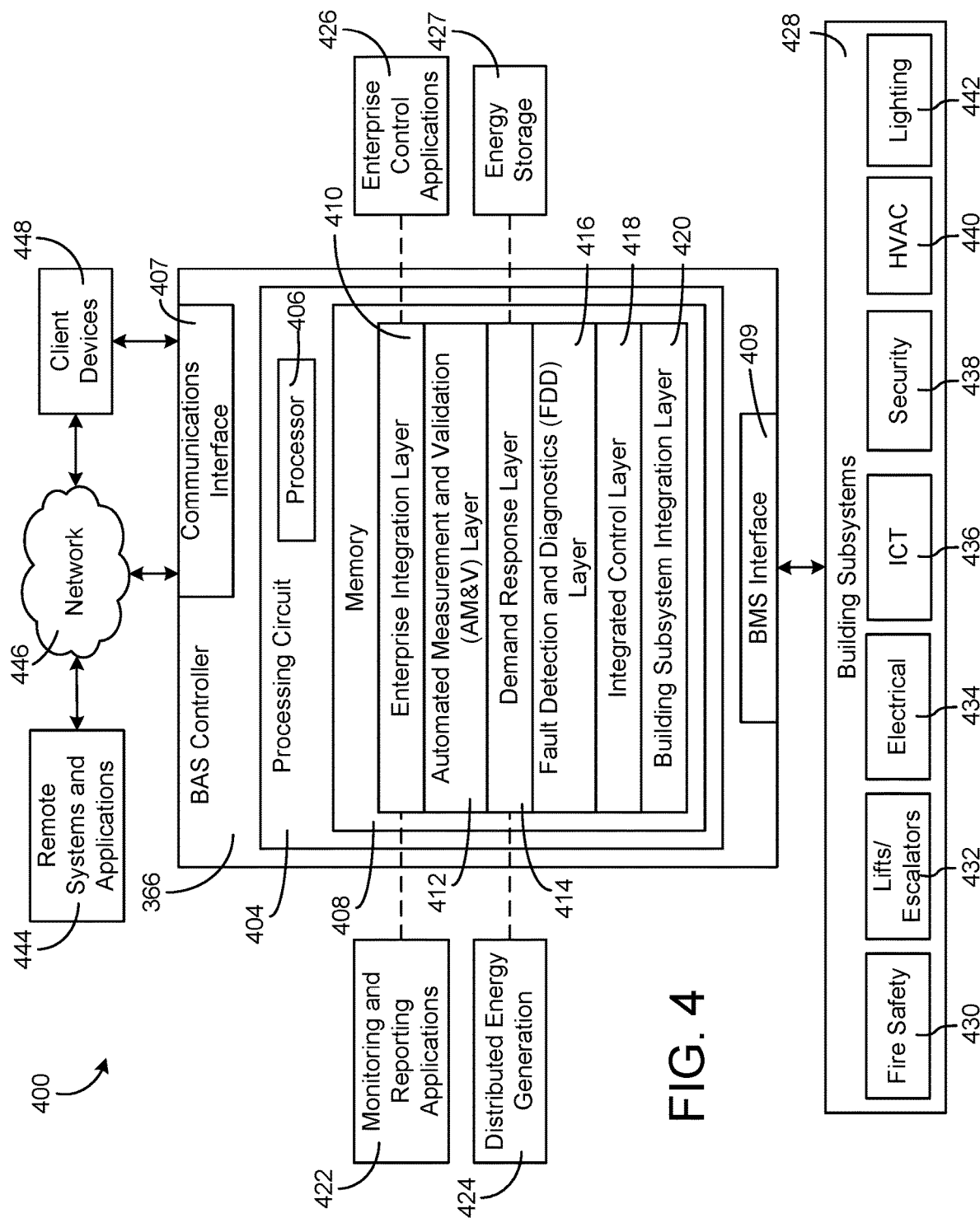
FIG. 4 is a block diagram of a building management system (BMS) which can be used to monitor and control the building of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a number of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a number of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a number of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a number of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a number of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a number of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and can correlate with the amount of energy consumed to achieve a desired supply air temperature. AHU 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a number of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a number of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translates communications (e.g., sensor data, input signals, output signals, etc.) across a number of multi-vendor/multi-protocol systems.

False Alarm Reduction System

Figure 5:
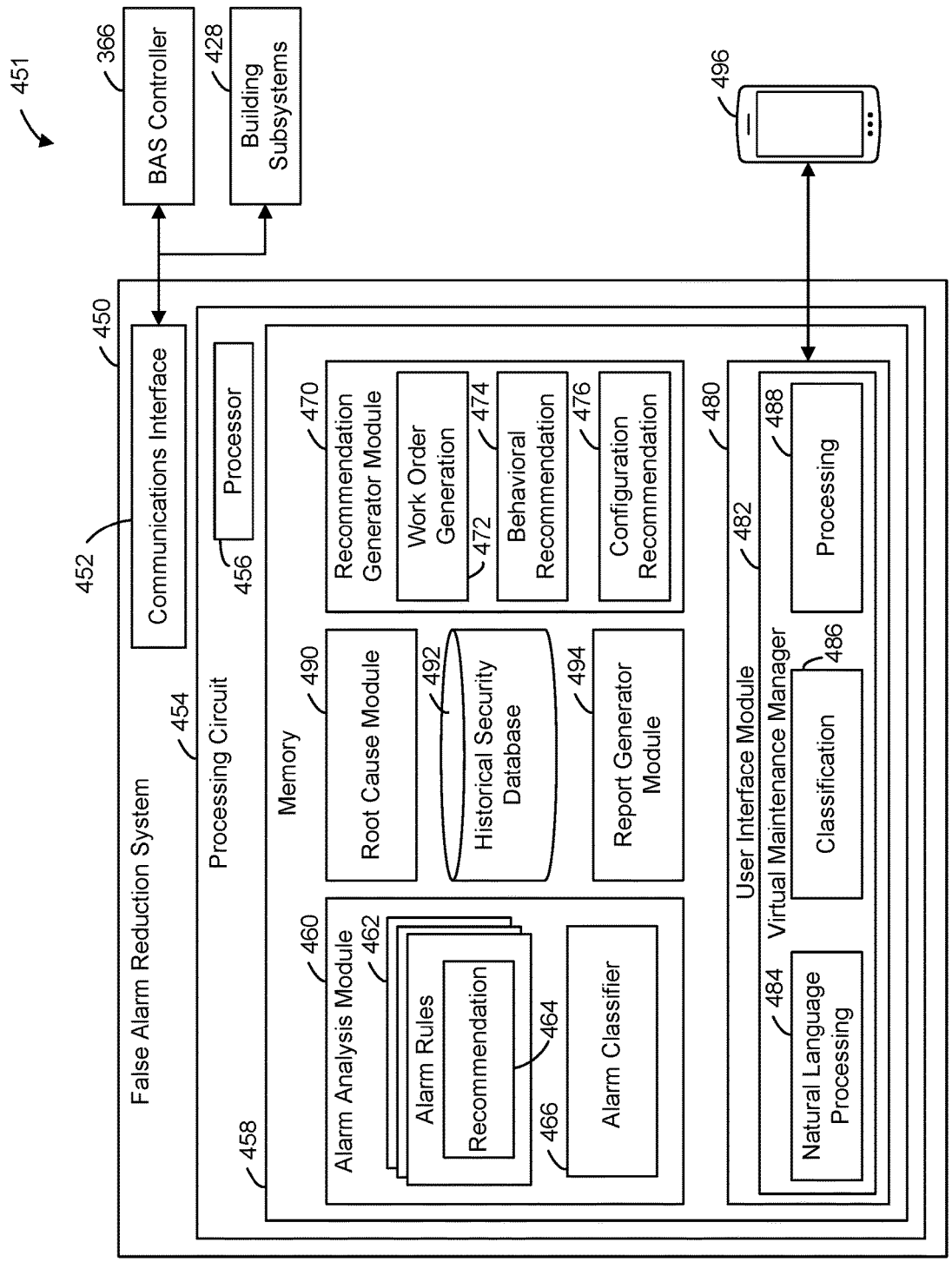
FIG. 5 is a block diagram of a false alarm reduction system which can be used to monitor the building of FIG. 1, according to some embodiments.

Referring now to FIG. 5, a system 451 for reducing false security alarms is shown, according to an exemplary embodiment. The system 451 may be part of the BAS controller 366. In some embodiments, the system 451 is part of building subsystems 428. For example, the system 451 may be part of security subsystem 438. Speaking generally, security systems (e.g., security subsystem 438) can protect residential or commercial premises by implementing functionality (e.g., intrusion detection, access control, video surveillance, and fire detection). In each case, sensors deployed at various locations in and around the building transmit data back to a central system to analysis. In some instances, such data is further transmitted to an offsite location that serves as a monitoring center. In either case, the sensor data can be analyzed to determine if a condition exists at the premises that requires attention by a security professional. For example, if a motion sensor detects that someone has entered a building at a time that the intrusion system is armed or if an access control system detects that a door is being forced open, that information is transmitted to the local or remote monitoring center which can deploy security guards or call the police.

Such security systems for detecting alarms (e.g., a fire, an intrusion, etc.) may not be foolproof. For example, employees can forget to turn on an alarm before leaving for the day or forget to reset an alarm after it is triggered. Further, an alarm system may have faulty devices that cause a building site to be at risk for longer periods of time than normal. For example, a bank may be robbed and a bank teller may trigger an alarm indicating for a police dispatch. After triggering the alarm, the alarm may need to be reset to provide security again. The bank teller may forget to turn off the alarm and leave for the day, causing the bank to be at risk of future robberies and break-ins without an active alarm system in place protecting it. Such site risk situations can be numerous and can relate to instances of substantial costs if an event occurs without an alarm going off that was meant to stop the event (e.g., a robbery, a fire, etc.). The long periods of time that particular building sites are at risk can be avoided if administrators can accurately identify which building sites are at risk the most often and what issues are causing the building sites to be at risk. The administrators can then provide the appropriate mechanisms (e.g., employee training, new employees, equipment updates, new equipment, etc.) so the identified building sites can operate without any unnecessary security risks.

System 451 may receive alarm events from security subsystem 438, classify the alarm events according to one or more rules and determine if the alarm events represent false alarms. If the alarm events represent false alarms, the system 451 may determine a root cause of the false alarm and provide one or more recommendations to a user to prevent future false alarms. In some embodiments, system 451 may provide an indication that an alarm event represents a false alarm thereby preventing the false alarm altogether. Additionally or alternatively, system 451 may receive request from a user for information and/or data related to BMS 400 and/or building subsystems 428 (e.g., security subsystem 438) and provide the requested information and/or data. In some embodiments, system 451 dynamically responds to user queries (input) via a virtual maintenance, as described in detail below.

To help BMS 400 and/or building subsystems 428 (e.g., security subsystem 438) classify and respond to false alarms, system 451 includes false alarm reduction system 450. False alarm reduction system 450 analyzes data received from BMS 400 to provide recommendations to a user regarding the functionality of one or more building subsystems 428 (e.g., security subsystem 438). In some embodiments, false alarm reduction system 450 can also be configured to interact with users via a virtual maintenance manager (e.g., chatbot, smart-assistant) as described in detail below. In some embodiments, false alarm reduction system 450 is coupled to or integrated with security subsystem 438.

False alarm reduction system 450, includes communications interface 452 and processing circuit 454. Communications interface 452 facilitates communication with user device 496, BAS controller 366, building subsystems 428, and/or any other device or system. Furthermore, communications interface 452 can be configured to communicate with all of the devices and systems described with reference to FIG. 4. In some embodiments, user device 496 is a mobile device (e.g., smartphone, tablet), while in some embodiments user device 496 is a desktop computer. Additionally or alternatively, user device 496 may be an application or website running on a mobile device and/or desktop computer.

Via communications interface 452, false alarm reduction system 450 receives (collects) security system data from BMS 400 and/or one or more of building subsystems 428 (e.g., security subsystem 438). In various embodiments, the false alarm reduction system 450 stores the security system data in historical security database 492. The security system data can include events such as an occurrence detected by a sensor of security subsystem 438. For example, an intrusion sensor may identify that an individual is trying to force a window open. Another event can be a sensor detecting dust as smoke, triggering an alarm and calling a fire dispatch. Further, another event can be a ground fault that triggered an alarm. The events further include signals. For example, a signal may be a continuous signal of a door being opened and a door being closed.

Processing circuit 454 includes processor 456 and memory 458. Memory 458 can include instructions which, when executed by processor 456, cause processor 456 to perform the one or more functions described herein. Processor 456 may be the same and/or similar to processor 406 as described in reference to FIG. 4 and memory 458 may be the same as and/or similar to memory 458 as described with reference to FIG. 4. Each of the processes and services conducted by false alarm reduction system 450 can also be conducted by BAS controller 366.

In addition to a traditional processor and memory, processing circuit 454 may include integrated circuitry for processing and/or control, e.g., one or more processors and/or processor cores (e.g., microprocessor and/or microcontroller) and/or FPGAs (Field Programmable Gate Array) and/or ASICs (Application Specific Integrated Circuitry). Processor 456 can include and/or be connected to and/or be configured for accessing (e.g., writing to and/or reading from) memory 458, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory).

Memory 458 can be configured to store code executable by control circuitry and/or other data, e.g., data pertaining to communication, e.g., configuration and/or address data of nodes, etc. Processing circuit 454 can be configured to implement any of the methods described herein and/or to cause such methods to be performed, e.g., by processor 456. Corresponding instructions may be stored in memory 458, which may be readable and/or readably connected to processing circuit 454. Memory 458 includes alarm analysis module 460, recommendation generator module 470, user interface module 480, root cause module 490, historical security database 492, and report generator module 494.

Speaking generally, alarm analysis module 460 may analyze and classify alarm events. In some embodiments, alarm analysis module 460 may identify conditions leading to false alarm events and fix them before they occur. Recommendation generator module 470 provides recommendations to a user to fix conditions leading to false alarms. In some embodiments, alarm analysis module 460 identifies conditions leading to false alarm events and recommendation generator module 470 determines a corresponding recommendation to address the false alarm event condition. User interface module 480 provides the recommendations from recommendation generator module 470 to a user. In some embodiments, user interface module 480 receives queries from a user for information and/or data relating to BMS 400 and/or building subsystems 428 (e.g., security subsystem 438) and responds to the queries. Root cause module 490 receives alarm events determined to be false alarm events from alarm analysis module 460 and determines a root cause of the false alarm events. Historical security database 492 stores alarm event data received from BMS 400 and/or building subsystems 428 (e.g., security subsystem 438). Additionally or alternatively, historical security database 492 may store results produced by alarm analysis module 460 and/or any classification data associated with received alarm events. Report generator module 494 receives requests to generate graphical displays of information and/or data associated with BMS 400 and/or building subsystems 428 (e.g., security subsystem 438) and generates the graphical displays accordingly.

Referring now specifically to alarm analysis module 460, alarm analysis module 460 predicts conditions that are precursors to a false alarm condition and fix the errors before they occur. In some embodiments, sensor data from commercial security products (e.g., security subsystem 438) is monitored by the alarm analysis module 460 and used to predict false alarms. Based on the predicted false alarms, the alarm analysis module 460 can be configured to generate preventative maintenance or training recommendations. In some embodiments, alarm analysis module 460 provides information to recommendation generator module 470 to generate recommendations.

Alarm analysis module 460 predicts and/or identifies anomalous behavior by tracking normal security product behavior at the protected premises. This past behavior can set a standard by which the security system (e.g., security subsystem 438) can be measured against. When a deviation from that norm is detected in the operation of the security system, the alarm analysis module 460 can be configured to analyze the type of deviation that occurred, determine whether the behavior is of a type that is a precursor to a false alarm condition, and determine a response that is necessary for preventing the false alarm from occurring.

Moreover, alarm analysis module 460 can predict other related aspects of the security product that may need attention. For example, if a magnetic door sensor is exhibiting aberrant behavior, the alarm analysis module 460 can be configured to generate a prediction that the magnetic door sensor will fail. Furthermore, alarm analysis module 460 can be configured to determine the age of that sensor as well as all similar sensors in the building that are the same type and age as the failing one. In some embodiments, alarm analysis module 460 can integrate with recommendation generator module 470 to notify building operators that the magnetic door sensor is failing and can indicate similar door sensors that may require attention.

464 to provide a solution to reduce false alarms. For example, an alarm rule may be indicative of particular event patterns that indicate that building employees are not being properly trained to utilize a security system. The alarm rule may include a recommendation indicating that building employees do not understand how to properly perform a particular job duty or operate particular security system devices.

Table 1 provides a number of example rules that alarm analysis module 460 may develop. In some embodiments, alarm rules 462 are input by a domain expert, as described in detail below. Alarm rules 462 may be used by alarm classifier 466 to classify received alarm events. Additional rules can be implemented in some embodiments.

TABLE 1

Example rules and descriptions for classifying alarm event data.

| Example Rule | Example Description |
| --- | --- |
| Door Delay | The number of unique alarms with open/close door within 120 seconds of the burglar alarm (BA) events and a cancel alarm event by authorization code within 120 seconds after the BA event. |
| Door Delay (with PD) | This is the same as Door Delay except that there is also an alarm event containing police dispatch (PD). |
| Burglary Alarm & Cancel (with PD) | This is an extension of the Door Delay. It is a BA followed by a Cancel event and a PD event. |
| Camera Not Connecting | Video monitoring system - a remote technician attempts to verify what is happening on-site but some cameras do not work. |
| Early Open | Alarm systems have a scheduled opening time. This rule occurs if there is an attempted opening before the scheduled opening time. |
| Employee Trip | A BA alarm occurs and an attempt is made to bypass it. The system is subsequently restored. An employee trips an alarm but does not have the authorization code to cancel the alarm. |
| Expansion Module | An expansion module is used to expand the capacity of an alarm system. If the expansion module is overloaded it causes an error event. |
| Ground Fault Rule | A ground fault is an electrical short. It can be caused by a short circuit or a break in an electrical cord. |
| Motion Sensor | A motion sensor is picking up motion through a window. Someone approaching the site normally sets off an internal motion sensor before entering a perimeter door and disabling the alarm. |
| Low Battery | Alarms systems may have a battery to ensure continuous power supply in case of a power failure. This rule may occur if the power failure lasts longer than expected. This leads to the battery running low. |
| PD After Site Not Contactable | Remote technician initiates a call to emergency services after failed attempts to contact the site. |
| Site Not Closed on Schedule | The site was not closed when it was scheduled to close. |
| Site Not Opened on Schedule | The site was not opened when it was scheduled to open. |
| Early Open with PD After Site Not Contactable | The Early Open and PD after site not contactable rules occur together. |
| Glass Door | This is similar to the Motion Sensor rule. There is a BA-GLASS event along with an Open event and followed by a cancel with an authorization code. |

Alarm analysis module 460 can be configured to analyze event data received from BMS 400 and/or building subsystems 428 (e.g., security subsystem 438). Additionally or alternatively, alarm analysis module 460 may analyze historical security data in historical security database 492 to determine alarm rules 462. In some embodiments, alarm event data received by false alarm reduction system 450 is stored in historical security database 492. The alarm rules 462 may indicate that particular patterns of events (e.g., alarms occurring, detected motion, etc.) are indicative of an event or situation that causes false alarm events. Furthermore, the alarm rules 462 may include recommendations Alarm analysis module 460 includes alarm classifier 466. In some embodiments, alarm events are associated with a classification, or classification level. The classification is determined by alarm classifier 466 via alarm rules 462 or selected by a user via user device 496. Classifications can identify a position of a rule within a hierarchical relationship and represent a ranking or classification level for each alarm event. If the criteria for multiple rules are satisfied based on a single sequence of events, alarm classifier 466 can be configured to identify which rule to select as being associated with a root cause of the sequence of events based on which rule has the highest classification. Alarm events can be tagged with classification tags including numbers that represent the classification of each alarm event in relation to other alarm events.

Alarm analysis module 460 can identify recommendations 464 to use in reducing the number of false alarms reported by the security subsystem 438. In some embodiments, alarm rules 462 can be surfaced to a domain expert that can review alarm rules 462 and the event sequences associated with alarm rules 462 and provide recommendations 464 for alarm rules 462. Systems and methods of security alarm rule analysis are described in detail in U.S. patent application Ser. No. 15/947,725 titled "Building Security System With Event Data Analysis For Generating False Alarm Rules For False Alarm Reduction," filed Apr. 6, 2018, the entirety of which is incorporated by reference herein.

Table 2 below indicates alarm rules 462 for determining recommendations that can be provided to an end user to reduce situations or events that cause false alarms. In some embodiments, recommendations 464 can be predetermined and paired with a rule. This can be done manually by a user, or automatically, based on previous responses to alarms. In Table 2, each rule indicates a name, a symptom, a diagnosis, and a service provider. In some embodiments, the recommendation names, symptoms, diagnosis, and/or service provider are provided by the domain expert via user device 496. In various embodiments, alarm analysis module 460 can determine which rule from Table 2 to use based on which classification was determined for the alarm event based on Table 1.

TABLE 2

Example rules for determining a recommendation classification.

| Rule Name | Symptom | Diagnosis | Service Provider |
|---|---|---|---|
| Broken Glass Detector | A broken glass detector is triggering false alarms. | (1) Glass break sensor installed improperly for local environment vibrations; (2) Hardware failure; or (3) Panel alarm threshold is too sensitive for local environment vibrations. | Onsite Service, Remote Service |
| Camera Not Connecting | Lost connection to camera. | Camera or wiring hardware failure. | Onsite Service |
| | | Camera or system running incorrect software. For example, CCTV NVR/DVR was updated, affecting programming for camera. | Onsite Service |
| | | Camera or system configured improperly. For example, if video is remotely managed and the camera shows missing in remote surveillance software (e.g., IMMIX) the IP, port or login may have changed onsite and was not updated. Alternatively, the camera was replaced and not called in for update to programming. | Remote Service |
| Early Open | Schedule violation reported from monitoring center. | The central monitoring schedule is not accurate for typical usage. For example, user disarms the system earlier than central monitoring schedule. | Monitoring Center, Customer |
| Employee Trip | An employee trips an alarm but does not have the authorization PIC code to cancel the alarm. | The user is not informed of their personal identification number (PIN) for security. | Customer |

TABLE 2-continued

Example rules for determining a recommendation classification.

| Rule Name | Symptom | Diagnosis | Service Provider |
| --- | --- | --- | --- |
| Entry Delay | While the system was armed, someone entered and triggered an alarm before disarming the system with an authorized PIC code. | System is programmed with too short of a delay for typical usage. | Monitoring Center |
| | | User entered via wrong door and took too long to disarm the system. | Customer |
| Exit Delay | Immediately after arming the system, someone triggered an alarm and disarmed the system with an authorized PIC code. | Employee used the wrong door to exit. | Customer |
| | | System is programmed with too short of a delay for typical employee usage. | Remote Service |
| Expansion Module | A system expansion module is sending "trouble" signal or failing outright. | A system expansion module is sending "trouble" signal or failing outright. | Onsite Service |
| Failed Timer Test | A periodically scheduled timer test was not received by the monitoring center from the system control panel. | Customer doesn't require scheduled timer. For example, ATI not required because no Dialer Test but data is input into the ATI. | Monitoring Center |
| | | Customer switched to voice over IP (VOIP). Customer may need to switch back to analog or work with sales on getting a different communicator type (e.g., IP, cell, phone, etc.) | Remote Service |
| | | Problem with customer's telecommunications line. Customer may have to have the phone line repaired. Problem may require a vendor to meet between system provider and the phone company. | Onsite Service |
| | | Improperly entered reporting address. For example, the report code in panel programming for Dialer Test was not enabled. | Remote Service |
| Ground Fault | A ground fault electrical problem was detected. (Should be filtered by rate of occurrence). | An electrical ground fault problem. | Onsite Service |
| Low Battery | Power failures are occurring and a low battery reported by the control panel. | A device in the field has a low battery. | Onsite Service |
| | | The control panel's battery is low. | Onsite Service |
| Motion Sensor | Motion sensor is triggering false alarms. | (1) Infra-red sensor alarm threshold is set too sensitive; (2) Someone found an unmonitored entry/exit point to use; or (3) User placed something in the path of the motion (e.g., balloon, sign). | Remote Service, Onsite Service, Customer |

TABLE 2-continued

Example rules for determining a recommendation classification.

| Rule Name | Symptom | Diagnosis | Service Provider |
|---|---|---|---|
| Site Not Closed On Schedule | Schedule violation reported from system control panel. | Arm/disarm schedule of control panel is not accurate for typical usage. | Remote Service |
| | | User arms the system later than auto arm/disarm schedule of control panel. | Customer |
| Site Not Contactable | Failed to contact users via call tree, leading to unnecessary alarm and police dispatch. | The call tree for this site is stale. | Monitoring Center |
| Site Not Opened On Schedule | Schedule violation reported from control panel. | Arm/disarm schedule of control panel is not accurate for typical usage. | Remote Service |
| | | User disarms system earlier than auto arm/disarm schedule of control panel. | Customer |

As mentioned above, in some embodiments, user device 496 is a domain expert device that a domain expert uses to interact with false alarm reduction system 450. The domain expert device may be used to access alarm rules 462. In some embodiments, a domain expert associated with the user device 496 can provide recommendations 464 for each of alarm rules 462. For example, the domain expert, via user device 496, can review alarm rules 462 and provide recommendations 464 for each alarm rule 462. A domain expert device can provide recommendations 464 that indicate a particular cause of a false alarm. For example, for a communication issue, recommendation 464 may indicate that communications wires should be replaced or inspected by a technician.

Table 3 below indicates recommendations that can be provided to an end user to reduce situations or events that cause false alarms. In Table 3, each recommendation indicates a title and a recommendation description. Specific recommendations may be determined based on alarm rules 462 such as the alarm rules shown in Table 2. In some embodiments, the recommendation names and/or recommendation descriptions are provided by the domain expert via user device 496. In various embodiments, alarm analysis module 460 can classify various events and/or event sequences into one of the recommendations shown in Table 3, below, i.e., the domain expert can define the recommendations of Table 3 and then alarm analysis module 460 can train a classifier (e.g., alarm classifier 466) to assign particular event sequences a recommendation name and/or recommendation description from Table 3.

TABLE 3

Example recommendations and descriptions for reducing false alarms.

| Recommendation Name | Recommendation Description |
|---|---|
| Instant Burglar Alarm (BA) Door Alarm | Fire exit door or a perimeter door that has been programmed for instant alarm. |
| Entry/Exit Delay | The amount of time has exceeded the entry/exit parameter programed |
| Employee Access | Employee is incorrectly entering or exiting building. Customer education. |
| Bypass Violation | Arming event that causes security vulnerability. |
| Interior Burglar Alarm | It appears a motion sensor is causing alarms through a window, before customer enters perimeter door and cancels. Consider moving sensor or trying to adjust sensitivity. |
| Aborted Burglar Alarm | An alarm with police dispatch was cancelled due to an authorized employee cancelling the alarm. |
| No Close | Multiple alarms are caused by the site closing off-schedule. Check or adjust schedule. |
| Irregular Early Open | Multiple alarms are caused by the site opening off-schedule or wrong authority level. Check or adjust schedule or authority level. |
| Low Battery | Battery needs to be replaced since building device has been operating for a long time after an AC power failure. |
| | Low battery is leading to multiple problems. Check or replace battery. |
| Video Verification Fail | We see a connection issue with the camera. |
| User Error | We have identified that employees needs training on working with the intrusion system. |
| Expansion Module | Hardware failure issue with accessory expansion module that causes a false alarm. |

TABLE 3-continued

Example recommendations and descriptions for reducing false alarms.

| Recommendation Name | Recommendation Description |
| --- | --- |
| Non Aborted Burglar Alarm | We have not been able to reach one of the authorized people from the call tree. |
| Ground Fault | A hardware electrical issue. |
| Glass Break or Vibration Sensor | A sensor that is causing an alarm from the glass break via internal and/or external conditions. |

Recommendation generator module 470 generates one or more recommendations based on information received from alarm analysis module 460. In some embodiments, alarm analysis module 460 identifies whether an event and/or a sequence of events are indicative of a situation causing a false alarm or indicating that a false alarm could occur and alerts recommendation generator module 470 to generate a recommendation to correct the false alarm. In some embodiments, recommendation generator module 470 determines recommendations based on alarm rules 462, such as the rules in Table 2. Based on recommendation 464, recommendation generator module 470 can provide suggestions or insights to user device 496. The suggestion may be to perform maintenance, e.g., inspecting or replacing communication wires. Furthermore, the recommendation may be to change a parameter of a sensor device. For example, a door delay parameter might be increased to prevent a false alarm pertaining to a door. In some embodiments, recommendations are specific to a type of user. Table 2 shows a category for service provider which indicates what service provider will received the corresponding recommendation. For example, a ground fault recommendation from Table 3 may be delivered to an onsite service provider as detailed in Table 2.

Recommendation generator module 470 may send one or more recommendations to a user using user device 496. In some embodiments, recommendation generator module 470 provides recommendations to virtual maintenance manager 482 to display to a user. Recommendation generator module 470 includes work order generation 472, behavior recommendation 474, and configuration recommendation 476. Work order generation 472 may generate a work order request for repair and/or service of one or more components. In some embodiments, work order generation 472 generates work order requests for components of security subsystem 438. For example, work order generation 472 may generate a request for an electrical ground fault to be repaired by an onsite service technician. In some embodiments, work order generation 472 sends a completed work order request form to a user using user device 496 for approval. Once approved, work order generation 472 may submit the work order request accordingly.

Behavioral recommendation 474 may generate a behavioral recommendation for a user using user device 496. For example, behavioral recommendation 474 may generate a recommendation for the customer to train employees to enter the secured location through a specific entrance to avoid causing an entrance alarm event. Recommendation generator module 470 may send the recommendation produced via behavioral recommendation 474 to the corresponding service provider (e.g., onsite service, remote service, monitoring center, customer, etc.). In some embodiments, recommendations produced by behavioral recommendations 474 include a personal identification number (PIN) associated with one or more employees having aberrant behavior and/or causing false alarms.

Configuration recommendation 476 may generate a configuration recommendation for a component and/or system. In some embodiments, configuration recommendation 476 generates configuration recommendations for security subsystem 438. For example, configuration recommendation 476 may generate a recommendation to change an entrance alarm delay timer for a security system to allow employees to deactivate the alarm after entering in the morning. In some embodiments, recommendation generator 470 sends the recommendation to a user using user device 496 for approval before implementing the configuration change. In some embodiments, recommendation generator module 470 submits a work order request to have onsite personnel adjust the appropriate configuration settings.

User interface module 480 communicates with users via user device 496. In some embodiments, user interface module 480 is a backend system for a mobile application installed and run on user device 496. In some embodiments, user interface module 480 can generate a web based interface for a user of user device 496 to log into via a web browser application of user device 496. User interface module 480 can generate the interfaces for display on mobile devices, e.g., cell phones and/or tablets, in addition to desktop computers and laptops. In some embodiments, user interface module 480 communicates with a user via audio (e.g., smart assistant) and/or via text (e.g., chatbot) as described in detail below.

User interface module 480 includes virtual maintenance manager 482 to interact with users intuitively and increase user engagement. Virtual maintenance manager 482 may serve as an intuitive interface for false alarm reduction system 450, BMS 400, and/or building subsystems 428 (e.g., security subsystem 438) allowing users to interact with false alarm reduction system 450 like a smart assistant. In some embodiments, virtual maintenance manager 482 is a chatbot as described in detail below. Virtual maintenance manager 482 includes natural language processing 484, classification 486, and processing 488. Natural language processing 484 can interpret text and/or speech of a user to determine a user request and/or a user input. Classification 486 can provide an indication of purpose. For example, a user request of "display alarm data for building 3," may be classified as a request for graphical data. Processing 488 can process a user request and generate an appropriate response. Specifics of virtual maintenance manager 482 are discussed in detail below.

Root cause module 490 identifies a root cause of one or more alarms set off within any given time period based on event data reported by security subsystem 438 or BMS 400. Root cause module 490 may receive alarm event data from alarm analysis module 460 and determine a root cause based on the alarm event data. The root cause may be used to develop an alarm rule 462 or recommendation 464. Systems and methods of security system root cause analysis are described in detail with reference to U.S. patent application Ser. No. 16/368,620 titled "Building Security System With False Alarm Reduction Using Hierarchical Relationships," filed Mar. 28, 2019, the entirety of which is incorporated by reference herein.

Report generator module 494 generates reports based on the building security data collected by security subsystem 438 and/or BMS 400. Reports can be data collected by building subsystems 428 and organized into a display as specified by an administrator (e.g., graphs, tables, summaries for each building site, etc.). In some embodiments, report generator module 494 can be configured to generate a report for one or more building sites selected by a user, via user interface module 480 for example. The report can be a comparison between the building sites and how often and/or how long each building site was in an at risk state within a time period selected by the administrator. Report generator module 494 may dynamically generate reports based on input received from a user via user interface module 480. Examples of dynamic report generation are described in reference to FIG. 7D.

In some embodiments, report generator module 494 receives report requests from a user via user interface module 480. A user at a user device (e.g., user device 496) can send requests, to report generator module 494 asking for different types of data (e.g., data specific to different building sites, data specific to different time periods, etc.). In some embodiments, user can request data specific to different risk types that are present at different building sites and compare data related to different building sites against each other. In some embodiments, users can also request data related to causes of false alarms and/or police dispatches at different building sites. Systems and methods of security system report generation are disclosed in U.S. patent application Ser. No. 16/368,611, titled "Building Security System With Site Risk Reduction," filed Mar. 28, 2019, the entirety of which is incorporated herein by reference.

Virtual Maintenance Manager

As described above, the present disclosure includes systems and methods that can simplify how alarm events from one or more sites are processed by a BMS to provide actionable insights for building personnel. In some embodiments, the number of false alarms can be reduced by helping the user identify and solve the underlying issue causing the alarms.

Figure 6:
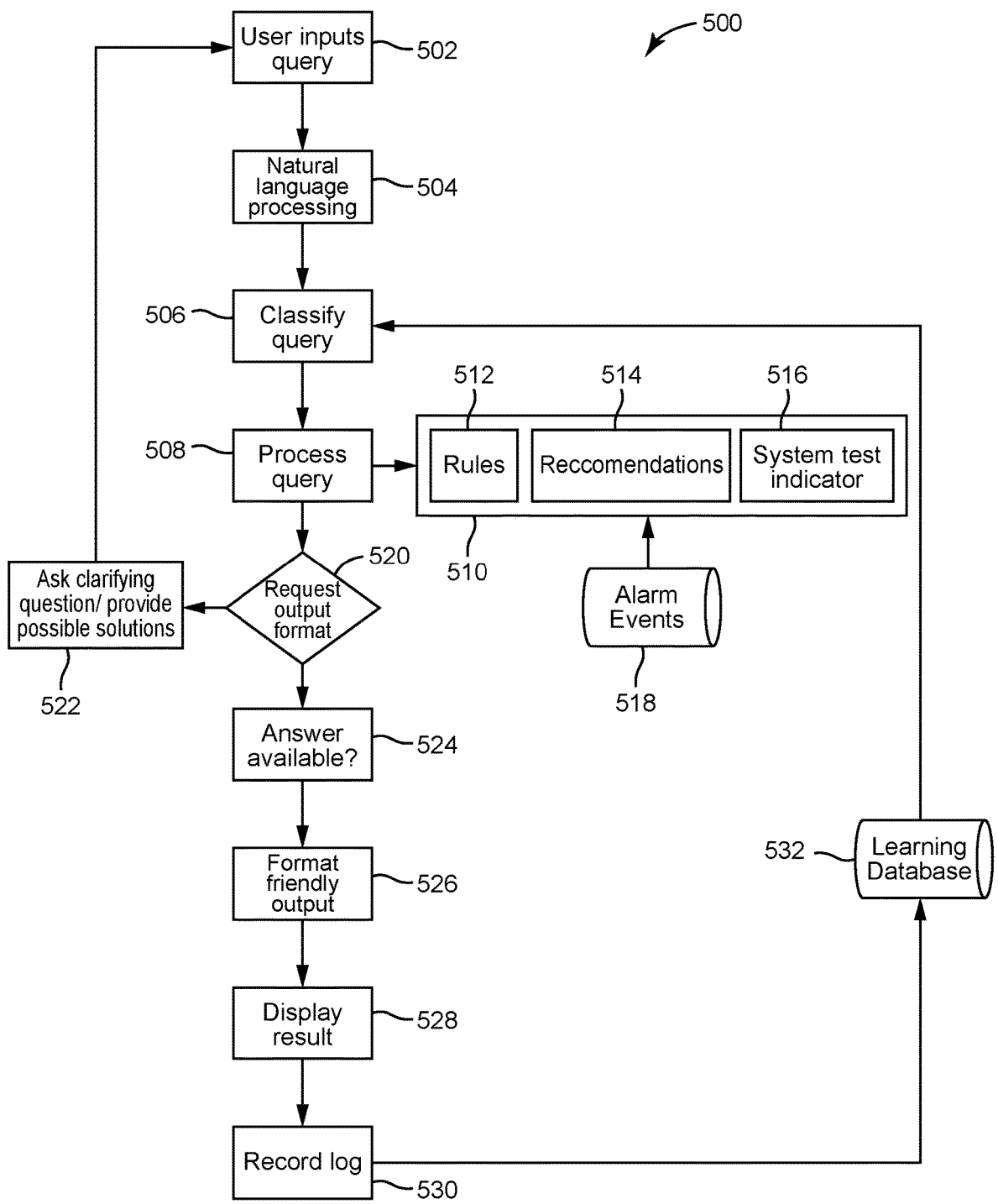
FIG. 6 is a flowchart of a method for implementing a virtual maintenance manager which can be used to monitor the building of FIG. 1, according to some embodiments.

FIGS. 5-6E show methods and interfaces for implementing a virtual maintenance manager, according to some embodiments. In some embodiments, the virtual maintenance manager can communicate with BMS controller 366 (FIG. 3). BMS controller 366 can provide the virtual maintenance manager with data from building subsystems 428 (FIG. 4), including alarm and fault data. Specifically, in some embodiments, communications interface 407 (FIG. 4) can facilitate communications between BMS controller 366 and monitoring and reporting applications 422 (e.g., the virtual maintenance manager). The virtual maintenance manager may act as an intuitive, user-friendly interface to interact with false alarm reduction system 450 and receive actionable insights into improving the functioning of an alarm system and reducing false alarms. In some embodiments, the virtual maintenance manager may respond to queries regarding the functionality of a security system. In some embodiments, the virtual maintenance manager is or is the same as virtual maintenance manager 482.

In some embodiments, the virtual maintenance manager is an expert system. An expert system includes a knowledge base and an inference engine. In some embodiments, alarm analysis module 460 serves as an inference engine and alarm rules 462 serve as a knowledge base. For example, a domain expert may generate a number of alarm rules 462 as described in detail with reference to FIG. 5.

Referring to FIG. 6, a flowchart of a process flow 500 for implementing a virtual maintenance manager which can be used to monitor building 10 is shown, according to some embodiments. Process flow 500 is shown to include inputting a user query (step 502). In some embodiments, a user can query the virtual maintenance manager through a chatbot (e.g., Slack). Alternatively, the user can provide a query through a voice-recognition application. Process flow 500 is further shown to include processing the query using natural language processing (NLP) software (step 504). The NLP software can interpret the meaning of the user's query. In some embodiments, the NLP software is the same as and/or similar to natural language processing 484. As shown, process flow 500 includes classifying the query (step 506). In some embodiments, the processed query can be classified by identifying intent and entity parameters. An intent parameter can provide an indication of purpose. An entity parameter can provide a specific term or object that provides context for the intent parameter. As one example, if a user query includes "show me alarm data for building 3," the intent parameter can be "show me," and the entity parameters can be "alarm data" and "building 3." In some embodiments, classification 486 classifies the user query.

Still referring to FIG. 6, process flow 500 is shown to include processing the query (step 508). In some embodiments, this can include using the intent and entity parameters to obtain an appropriate response and/or output. In some embodiments, answers can be obtained from an analysis database (step 510). The analysis database can include rules (step 512), recommendations (514), and/or system test indicator(s) (step 516). System test indicators can be used to identify when a test of the system (e.g., HVAC system 100, security subsystem 438) has been performed. In some embodiments, the analysis database of step 510 can be updated based on new alarm events (step 518). The update can occur in real-time, or at specified intervals of time. In some embodiments, the rules and recommendations are the same as alarm rules 462 and recommendations 464 discussed above. In some embodiments, processing 488 processes the user query. Additionally or alternatively, processing 488 may interact with one or more elements of false alarm reduction system 450 (e.g., alarm analysis module 460, recommendation generator module 470, report generator module 494, etc.) to process the user query.

In some embodiments, process flow 500 can include determining if an answer is available (step 520). If an answer is not available (i.e., the result of step 520 is "no"), then process flow 500 is shown to include asking a clarifying question and/or providing possible solutions (step 522). Alternatively, if an answer is available (i.e., the result of step 520 is "yes"), then process flow 500 is shown to include requesting an output format (step 524). In some embodiments, output formats can include text on the user interface (e.g., within the chatbot), images on the user interface (e.g., graphs, pictures), audio, and/or email. Additional output formats can be included.

As shown, once a user selects an output format, process flow 500 includes formatting the output (step 526). In some embodiments, the formatting can include preparing graphs or images, and/or using text-to-speech conversion. For example, report generator module 494 may generate a histogram of alarm activity. Process flow 500 is further shown to include displaying the result (step 528). For example, the result may be displayed via a web application on user device 496. In some embodiments, an audio output can be provided to the user, as opposed to a visual display. The display output can include text, values, and/or visual representations of data.

In some embodiments, the output of process flow 500 can include one or more recommendations, as described in detail with reference to FIG. 5. For example, process flow 500 may include recommendation generator module 470 generating a work order request for approval by a user. Further, process flow 500 may include recommendation generator module 470 generating a behavioral recommendation. For example, behavioral recommendation 474 may recommend training for employees to reduce the amount of "piggybacking" through security control points.

In some embodiments, process flow 500 can include recording the interaction (step 530). The record can be provided to a learning database (step 532). In some embodiments, the learning database can be configured to improve query classification by analyzing new recordings. If the user has another query, process flow 500 can be repeated. In some embodiments, learning database 532 is the same as historical security database 492.

Referring now to FIGS. 7A-7E, an example user interaction with a virtual maintenance manager, shown as Alarm Manager 600, via a user interface 602 is shown, according to some embodiments. As shown, a user (e.g., Abdul) can enter queries into chat box 604. Each of the queries and corresponding responses from Alarm Manager 600 can be displayed via user interface 602.

In some embodiments, process flow 500 can be implemented via Alarm Manager 600 and user interface 602. Further, Alarm Manager 600 can be included in memory 408 of BMS controller 366. Alternatively, Alarm Manager 600 can be an external application configured to communicate with BMS controller 366. In some embodiments, Alarm Manager 600 is the same as virtual maintenance manager 482.

Figure 7A:
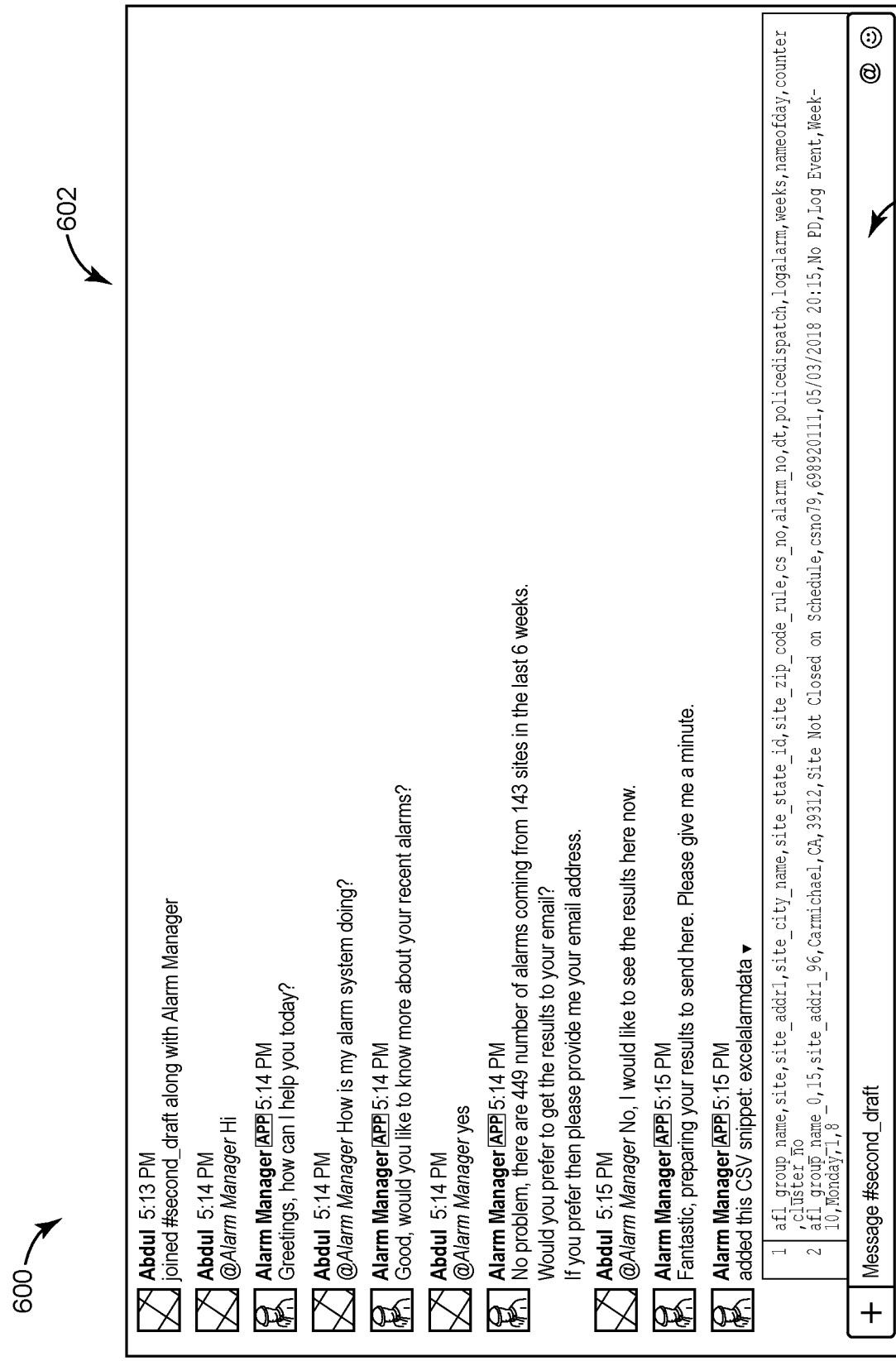
FIG. 7A is an example user interaction with a virtual maintenance manager via a user interface, according to some embodiments.

As shown by FIG. 7A, when the user initiates the chat, Alarm Manager 600 can provide a greeting message and prompt the user to provide any desired queries. In some embodiments, Alarm Manager 600 can suggest an output format for the requested data. As shown, the user can reject the suggestion and provide a desired output format. In some embodiments, data can be displayed directly via user interface 602. This can be beneficial when the query relates to a small data set.

As shown by FIG. 7B, a user can request alarm data for all monitored sites. Further, in some embodiments, the user can provide an email address directly in chat box 604, and Alarm Manager 600 can send messages to the provided email.

As shown by FIG. 7C, a user can request specific alarm data. In some embodiments, the user can provide an identifier corresponding to a predetermined alarm rule, and Alarm Manager 600 can locate the corresponding alarm data. In addition to requesting specific alarm data, a user can request site-specific data. As shown, a user can ask for site status information, and Alarm Manager 600 can provide an overview of the common alarms that have occurred.

As shown by FIG. 7D, Alarm Manager 600 can generate visual displays of requested data. In some embodiments, for example, a graph can be displayed on user interface 602. The graph can provide past alarm data.

Figure 7E:
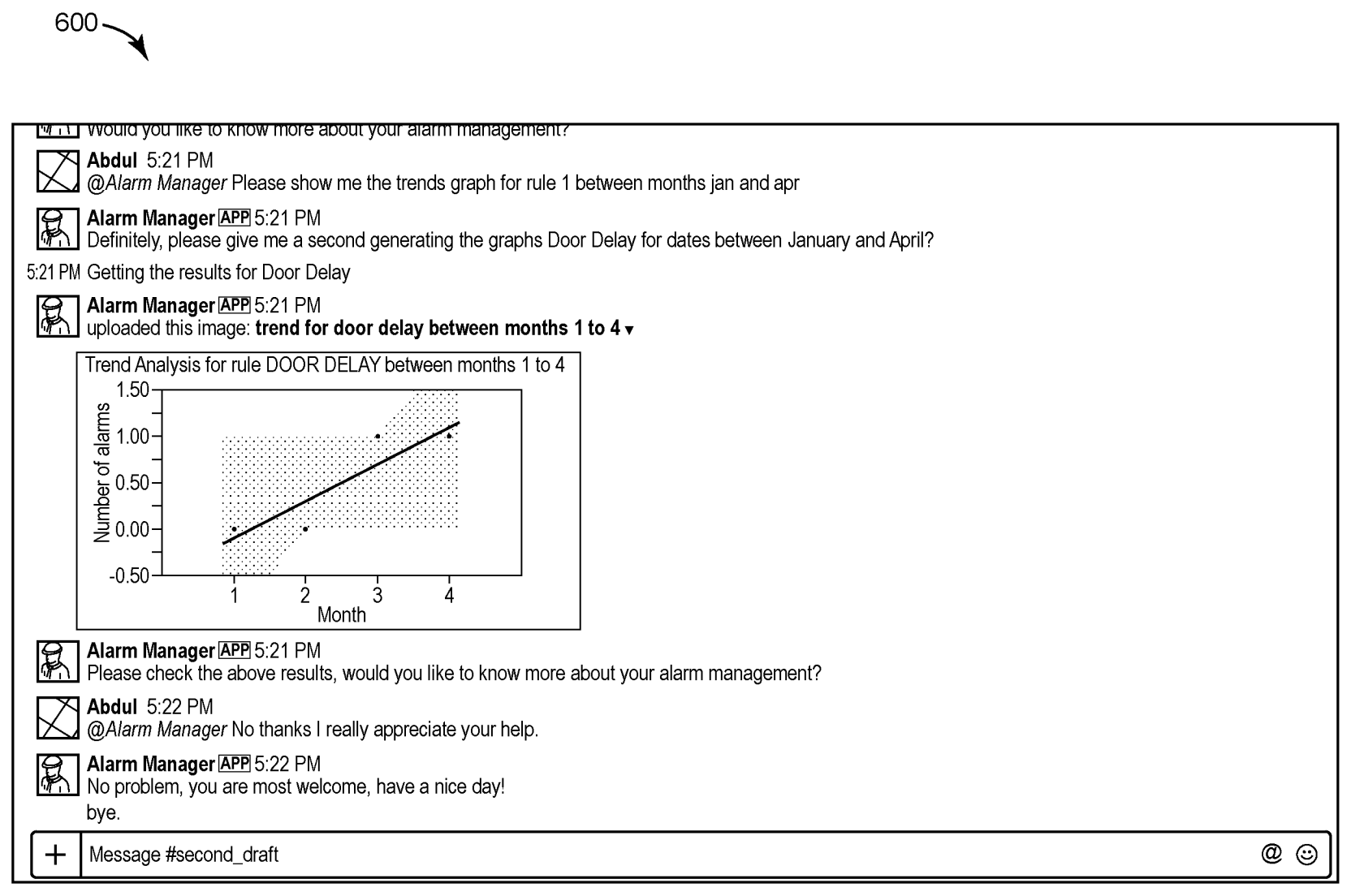

As shown by FIG. 7E, Alarm Manager 600 can generate additional displays of requested data. In some embodiments, a graph can be displayed that includes trend data for specific sites, specific rules, or other desired parameters.

Additional configurations of user interface 602 are included in the scope of the present disclosure. In some embodiments, a custom user interface and/or layout can be implemented.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps can differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A user interface for a security system, the user interface comprising:
   a processing circuit, the processing circuit comprising a processor and memory coupled to the processor, the memory having instructions stored thereon that, when executed by the processor, cause the processing circuit to:
   receive, from a user via a user device, a user request for information relating to the security system, wherein the user request is a request for a recommendation to reduce a number of false alarms;
   determine, using natural language processing, an intent and one or more entities associated with the user request, the intent describing a purpose of the user request and the one or more entities describing a type or source of security system data;
   generate a response to the user request based on the intent and the one or more entities, wherein the response is a graphical display of security system data; and
   send the response to the user device.

2. The user interface of claim 1, wherein the user interface generates a recommendation based on one or more rules, wherein the one or more rules are associated with the one or more entities.

3. The user interface of claim 2, wherein the recommendation is a work order request, wherein the work order request is a request for a technician to service a component of the security system.

4. The user interface of claim 2, wherein the recommendation is a behavioral recommendation, wherein the behavioral recommendation describes employee training.

5. The user interface of claim 2, wherein the recommendation is a configuration recommendation, wherein the configuration recommendation describes a configuration change for a component of the security system.

6. The user interface of claim 2, wherein the one or more rules are generated based on analysis of security system data received from the security system, wherein the analysis comprises categorizing the security system data to determine if the security system data represents a false alarm.

7. The user interface of claim 2, wherein the user interface generates the recommendation using an expert system, wherein at least one of the one or more rules are generated by human experts.

8. The user interface of claim 2, wherein security system includes a model of normal behavior of at least one component of the security system and wherein the recommendation is a prediction of an impending failure of the at least one component based on a deviation from the model.

9. The user interface of claim 2, wherein security system includes patterns of events generated by the security system and wherein the user interface analyzes the patterns to determine the recommendation.

10. The user interface of claim 2, wherein the one or more rules classify event data from the security system and wherein the recommendation is based on a classification of event data associated with the one or more entities.

11. A method of interacting with a security system, the method comprising:
    receiving, from a user via a user device, a user request for information relating to the security system, wherein the user request is a request for a recommendation to reduce a number of false alarms;
    determining, using natural language processing, an intent and one or more entities associated with the user request, the intent describing a purpose of the user request and the one or more entities describing a type or source of security system data;
    generating, based on the intent and one or more entities, a response to the user request, wherein the response is a graphical display of security system data; and
    sending the response to the user device.

12. The method of claim 11, the method further comprising generating a recommendation based on one or more rules, the one or more rules associated with the one or more entities.

13. The method of claim 12, wherein the recommendation is a work order request, wherein the work order request is a request for a technician to service a component of the security system.

14. The method of claim 12, wherein the recommendation is a behavioral recommendation, wherein the behavioral recommendation describes employee training.

15. The method of claim 12, wherein the recommendation is a configuration recommendation, wherein the configuration recommendation describes a configuration change for a component of the security system.

16. The method of claim 12, wherein the one or more rules are generated based on analysis of security system data received from the security system, wherein the analysis comprises categorizing the security system data to determine if the security system data represents a false alarm.

17. A security system for a building management system (BMS), comprising:
    a plurality of sensors located throughout a secure area, the plurality of sensors configured to collect information relating to the secure area;
    a false alarm reduction system configured to receive the information from the plurality of sensors and determine if the information relates to a false alarm; and
    a virtual maintenance manager to allow a user to interact with the security system, the virtual maintenance manager configured to:
    receive, from the user via a user device, a user request for information relating to the security system, the user request is a request for a recommendation to reduce a number of false alarms;
    determine, using natural language processing, an intent and one or more entities associated with the user request, the intent describing a purpose of the user request and the one or more entities describing a type or source of security system data;
    generate, a response to the user request based on the intent and the one or more entities, wherein the response is a graphical display of security system data; and
    send the response to the user device.

18. The security system of claim 17, wherein the virtual maintenance manager generates a recommendation based on one or more rules, the one or more rules associated with the one or more entities.

19. The security system of claim 18, wherein the recommendation is a work order request, wherein the work order request is a request for a technician to service one or more sensors of the plurality of sensors.

20. The security system of claim 18, wherein the recommendation is a behavioral recommendation, wherein the behavioral recommendation describes employee training.

21. The security system of claim 18, wherein the recommendation is a configuration recommendation, wherein the configuration recommendation describes a configuration change for one or more sensors of the plurality of sensors.

* * * * *